W. SYKES.
SPEED CONTROL SYSTEM FOR INDUCTION MOTORS.
APPLICATION FILED OCT. 24, 1916.
1,296,136.
Patented Mar. 4, 1919.
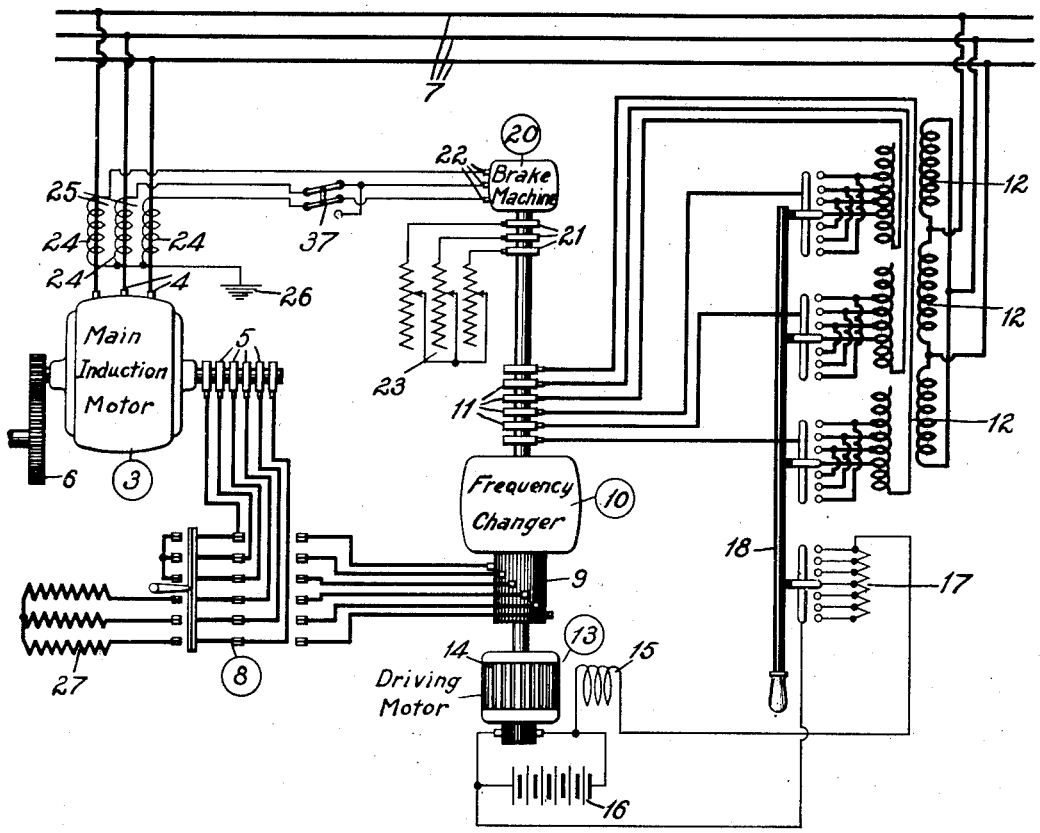
WITNESSES:
R. J. Fitzgerald
N. Davis
INVENTOR
Wilfred Sykes.
BY
Wesley G. Carr
ATTORNEY

UNITED STATES PATENT OFFICE.

WILFRED SYKES, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-CONTROL SYSTEM FOR INDUCTION-MOTORS.

1,296,136. Specification of Letters Patent. Patented Mar. 4, 1919.

Application filed October 24, 1916. Serial No. 127,386.

*To all whom it may concern:*

Be it known that I, WILFRED SYKES, a subject of the King of Great Britain, and a resident of Pittsburgh, in the county of Allegheny and State of Pennsylvania, have invented a new and useful Improvement in Speed-Control Systems for Induction-Motors, of which the following is a specification.

My invention relates to systems of control for induction motors, and it has for its object to provide a system that shall be capable of application to induction motors of the largest sizes and shall be flexible and economical in operation and substantially free from surging and allied harmful phenomena.

In the accompanying drawing, the single view is a diagrammatic view of an induction motor, together with its attendant supply and control circuits, constructed in accordance with a preferred form of my invention.

An old and well known method of varying the speed of a large-capacity induction motor is to connect a frequency-changer and adjustable transformers between the secondary winding thereof and the source. Energy derived from the secondary winding during under-synchronous operation is suitably changed in frequency in the frequency-converter and in voltage in the transformer for return to the system. Similarly, energy derived from the system has been appropriately changed in voltage in the transformer and in frequency in the frequency-converter for introduction in the secondary of the main induction motor for over-synchronous operation.

The frequency-changer of the prior systems has either been self-propelled or has been driven by a separate motor. By variations in the speed of said frequency-changer, the desired alterations in the ratio of frequency conversion therein have been obtained.

In a copending application of B. G. Lamme, Serial No. 583, filed Jan. 5, 1915, and assigned to the Westinghouse Electric & Manufacturing Company, is disclosed a system of the character indicated, and the necessity is shown, for stable operation, of having the frequency imposed upon the secondary of the main induction motor of the frequency-changer (slip frequency) increase with an increase of load upon the main induction motor by substantially the same percentage that the speed of the main induction motor would be reduced because of resistance slip under like load conditions. In other words, the said application points out the desirability of having the load-speed characteristic of the driving motor for the frequency changer approximate in shape the load-speed characteristic of the main induction motor when operating with a suitable amount of resistance in the secondary winding thereof under like conditions of load.

Two distinct methods of obtaining the desired speed adjustment of the frequency converter are disclosed in said aforementioned application. One of these is by driving the frequency-converter by an alternating-current motor of the commutator type and adjusting the field voltage of said motor in accordance with the load on the main induction motor through a current transformer in order to obtain the desired speed adjustment thereof. The other method of speed control is to place a mechanical brake, of the electrically operated type, upon the shaft of the frequency-converter and to energize said brake in accordance with the load on the main induction motor. Since the normal load on the motor driving the frequency changer consists solely of the iron, copper, friction and windage losses in the two auxiliary machines, it is apparent that a brake of relatively small dimensions will suffice to produce the desired speed reduction in the frequency-converter.

In a copending application of B. G. Lamme and Wilfred Sykes, Serial No. 126,907, filed Oct. 21, 1916, and assigned to the Westinghouse Electric & Manufacturing Company, is disclosed a system that is similar, in general, to the last mentioned system but the braking effect is produced by a dynamo-electric machine operating at times as a motor and at other times as a generator, thus producing a positive or a negative braking effect, as is required for over and under-synchronous operation of the main induction motor, respectively. By the present invention, I provide a similar system but the braking effect is produced by an induction machine operating at more than 100% slip. Under these conditions, a machine of the character designated has its torque in opposition to its direction of rotation, as pointed out for example, on pages 297 to 299, inclusive, of the 1902 edition of a work entitled "*Theoretical Elements of Electrical Engineering*" by C. P. Steinmetz. The induction machine, therefore, operates as a braking machine and, by variation of the secondary resistance thereof, the braking effect may be widely varied. A marked advantage of this type of apparatus is that the braking effect varies with the primary impressed voltage which may, therefore, be supplied in accordance with the load current of the main induction motor and, furthermore, the machine is entirely alternating current in nature, necessitating no auxiliary direct-current sources for its proper operation. Furthermore, by a simple phase reversal, said brake machine may be caused to operate as a motor to speed up the frequency changer during over-synchronous operation of the main motor, provided the brake machine has a sufficiently small number of poles.

Referring to the drawing for a more detailed understanding of my invention, I show a main induction motor at 3, said motor being provided with primary terminals 4—4 and with secondary terminals 5—5 in the form of the usual slip rings. The motor 3 may be mechanically coupled to any desired load, such, for example, as a rolling mill, through suitable gearing 6. Energy for the operation of the main induction motor is derived from a suitable supply system 7, shown as of the three-phase type, through cut-out switches and protective apparatus (not shown).

Energy derived from the secondary member of the motor 3 through the slip rings 5—5 is supplied, through a suitable starting switch 8, to the commutator 9 of a frequency converter 10 of any desired form, such, for example, as that described and claimed in U. S. Patent No. 682,943, issued to the Westinghouse Electric & Manufacturing Company on Sept. 17, 1901, upon an application filed by B. G. Lamme. Briefly speaking, a frequency converter of the character designated comprises an armature the winding of which is connected both to the segments of a commutator and to appropriate slip rings. Said armature is driven at a speed corresponding to the difference in frequency between the input and the output frequencies, as is well known in the art. If said frequency-changer is not of the self-propelled type, the stator thereof may be unprovided with field windings or, in fact, the stator may be done away with entirely and an iron keeper or armature may rotate with the main armature to perform the function of the stator in closing the magnetic circuit.

The slip-rings 11—11 of the machine 10 are preferably mounted at the other end thereof from the commutator 9 and are connected through adjustable transformers 12—12 to the supply system 7. The frequency changer 10 is driven by a motor 13, preferably of the direct-current type because of the facility of speed control of apparatus of this character. Said motor 13 comprises an armature 14 and a field winding 15. Energy for the operation thereof is derived from any suitable source 16, and the degree of excitation of the field winding 15 is determined by a resistor 17 arranged to be adjusted concurrently with the adjustment of the transformers 12—12, as by a suitable sliding handle 18 or by other forms of mechanical or electrical interlocking.

A brake machine 20 is mounted on the shaft of the frequency changer 10 and, in this particular system, has the form of an induction machine with rotor terminals in the form of slip rings 21—21 and stator terminals 22. The rotor terminals 21 are connected in star through an adjustable polyphase resistor 23 and, in like manner, the terminals 22—22 are connected in star through the windings 24—24 of current transformers 25—25, the other windings of which are inserted in the supply leads of the main motor 3. When the main induction motor is operating at under-synchronous speeds, the connections are such that the machine 20 is driven against its torque, causing it to operate as a generator and to supply energy to the resistor 23 for dissipation as heat. The neutral point of the star connection of the windings 24—24 is preferably grounded, as shown at 26, to reduce the voltage strains on the auxiliary system.

Having thus described the arrangement of a system embodying my invention, the operation is as follows: The main induction motor is started in any desired manner as, for example, by throwing the starting switch 8 to the left, interconnecting portions of the secondary winding thereof through a resistor 27 to obtain starting torque. The motor is thus brought up to substantially the desired speed, which may be, for example 75% of the synchronous speed thereof. The frequency changer 10 is then adjusted to such speed, through the movement of the handle 18 and the consequent adjustment of the excitation of the field winding 15, as to convert the secondary energy of the induction motor, having a frequency of 25% of line frequency, to the frequency of the line. The movement of the handle 18, in adjusting the resistor 17, at the same time produces suitable adjustment of the transformers 12—12 so that the energy derived from the secondary of the main induction motor is also suitably changed in voltage for return to the system.

Assuming light load on the main induction motor, a relatively low voltage is induced in the windings 24—24 of the current transformers 25—25 that produces light excitation of the machine 20 and the impression of only a low voltage upon the resistor 23, with small resultant braking action. An increase in the load of the main induction motor increases the voltage induced in the windings 24—24, thus increasing the excitation of the machine 20 and, therefore, increasing the braking action thereof. As a result, the shunt motor 13 decreases in speed by the same percentage that the main induction motor would decrease in speed, because of the resistance slip, under a like load increase. The rate of increase of braking action of the machine 20 or, in other words, the determination of the resultant characteristic of the machine 13, when connected to its load, may be determined by the adjustment, once for all, of the resistor 23.

The secondary voltage of the main induction motor is a maximum at standstill, falling to a minimum at synchronism and rising to a similar maximum at double synchronism. It is, therefore, necessary that the ratio of transformation of the transformers 12—12 be a minimum at standstill, rise to a maximum at synchronism and fall to another minimum at double synchronism, considering the supply-system windings thereof as the primary side.

The speed of the driving motor 13 is continually increased as the main motor speed passes up through synchronism.

The above-desired control effects may be be obtained by means of the handle 18 by providing each of the transformers with two sets of contact studs arranged in inverse order, as shown, while providing the resistor 17 with but one set of studs, extending over the same range as a double set of transformer studs. Thus, a movement of the handle 18 from one end of its travel to the other produces a unidirectional adjustment of the resistor 17 but a bilateral adjustment of the ratio of transformation of the transformer 12—12.

It will be understood that the sliding handle 18 is merely illustrative of many forms of mechanical or electrical interlocking which might be advantageously employed but all of said interlocking systems would necessarily embody the above mentioned operating features.

While I have shown my invention in its preferred form, it will be obvious to those skilled in the art that it is susceptible of various minor changes and modifications without departing from the spirit thereof and I desire, therefore, that only such limitations shall be placed thereupon as are imposed by the prior art or as are set forth in the appended claims.

I claim as my invention:

1. The combination with a main induction motor provided with a wound secondary member, of a source of alternating current connected to the primary member thereof, a frequency-changer connected between the secondary member of said induction motor and said source, driving means for said frequency changer, a braking device mechanically coupled to said frequency changer and comprising an auxiliary induction machine operating at more than 100% slip, and means for varying the braking action of said auxiliary induction machine in substantial accordance with the load on the main induction motor.

2. The combination with a main induction motor provided with a wound secondary member, of a source of alternating current connected to the primary member thereof, a frequency-changer connected between the secondary member of said induction motor and said source, driving means for said frequency changer, a braking device mechanically coupled to said frequency-changer and comprising an auxiliary induction machine operating at more than 100% slip, and means for energizing the primary member of said auxiliary induction machine in substantial accordance with the load on said main induction motor.

3. The combination with a main induction motor provided with a wound secondary member, of a source of alternating current connected to the primary member thereof, a frequency-changer connected between the secondary member of said induction motor and said source, driving means for said frequency changer, a braking device mechanically coupled to said frequency-changer and comprising an auxiliary induction machine operating at more than 100% slip, and means for varying the secondary resistance of said auxiliary induction machine.

4. The combination with a main induction motor provided with a wound secondary member, of a source of alternating current connected to the primary member thereof, a frequency-changer connected between the secondary member of said induction motor and said source, driving means for said frequency changer, a braking device mechanically coupled to said frequency-changer and comprising an auxiliary induction machine operating at more than 100% slip, means for energizing the primary member of said auxiliary induction machine in substantial accordance with the load on said main induction motor, and means for varying the secondary resistance of said auxiliary induction machine.

In testimony whereof, I have hereunto subscribed my name this 20th day of Oct. 1916.

WILFRED SYKES.